US008692686B2

(12) United States Patent
Davis et al.

(10) Patent No.: US 8,692,686 B2
(45) Date of Patent: Apr. 8, 2014

(54) SUBSEA ELECTRONICS MODULE AND METHODS OF LOADING SOFTWARE THEREON

(75) Inventors: Julian Davis, Frampton Cotterell (GB); Ian Kent, Nailsea (GB); Robert Dalziel, Highbridge (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 1119 days.

(21) Appl. No.: 12/217,636

(22) Filed: Jul. 8, 2008

(65) Prior Publication Data

US 2009/0031297 A1    Jan. 29, 2009

(30) Foreign Application Priority Data

Jul. 25, 2007   (GB) .................................. 0714471.0

(51) Int. Cl.
*G01V 3/00*          (2006.01)
(52) U.S. Cl.
USPC ...................................................... 340/854.9
(58) Field of Classification Search
USPC ............................................................ 717/177
See application file for complete search history.

(56) References Cited

U.S. PATENT DOCUMENTS

| 5,523,761 | A  | * | 6/1996  | Gildea ...................... 342/357.31 |
| 6,018,501 | A  |   | 1/2000  | Smith et al.                            |
| 6,144,848 | A  | * | 11/2000 | Walsh et al. ................... 455/419 |
| 6,364,021 | B1 | * | 4/2002  | Coats ............................. 166/350 |
| 6,438,468 | B1 | * | 8/2002  | Muxlow et al. .................... 701/3 |
| 2004/0159430 | A1 | * | 8/2004 | Baggs ...................... 166/250.15 |
| 2004/0262008 | A1 |   | 12/2004 | Deans et al. |
| 2007/0024464 | A1 | * | 2/2007 | Lemenager et al. ........ 340/853.1 |
| 2007/0027589 | A1 | * | 2/2007 | Brinkley et al. .................. 701/3 |
| 2007/0296170 | A1 | * | 12/2007 | Field et al. ................ 280/47.131 |
| 2008/0002758 | A1 | * | 1/2008 | Schmidt et al. ............... 375/130 |
| 2008/0244559 | A1 | * | 10/2008 | Imasato et al. ................ 717/174 |
| 2009/0166034 | A1 | * | 7/2009 | Mundell .................. 166/250.15 |

FOREIGN PATENT DOCUMENTS

| GB | 2377131 A | 12/2002 |
| GB | 2396086 A | 6/2004 |
| GB | 2427227 A | 2/2005 |
| GB | 2417742 A | 3/2006 |
| GB | 2421524 A | 6/2006 |
| GB | 2422465 A | 7/2006 |
| GB | 2427227 A | 12/2006 |
| GB | 2417742 B | 8/2009 |

* cited by examiner

*Primary Examiner* — Li B Zhen
*Assistant Examiner* — Joanne Macasiano
(74) *Attorney, Agent, or Firm* — Bracewell & Giuliani LLP

(57) ABSTRACT

An electronics module for a well installation configured to receive software via a wireless connection and methods of installing software on an electronics module for a well installation, are provided. An example of such electronics module comprises a short-range wireless receiver for wirelessly receiving software and/or data from an external wireless source. Modem external interface wiring can be employed as an antenna for the wireless receiver to receive the wireless transmission of the software and/or data.

19 Claims, 1 Drawing Sheet

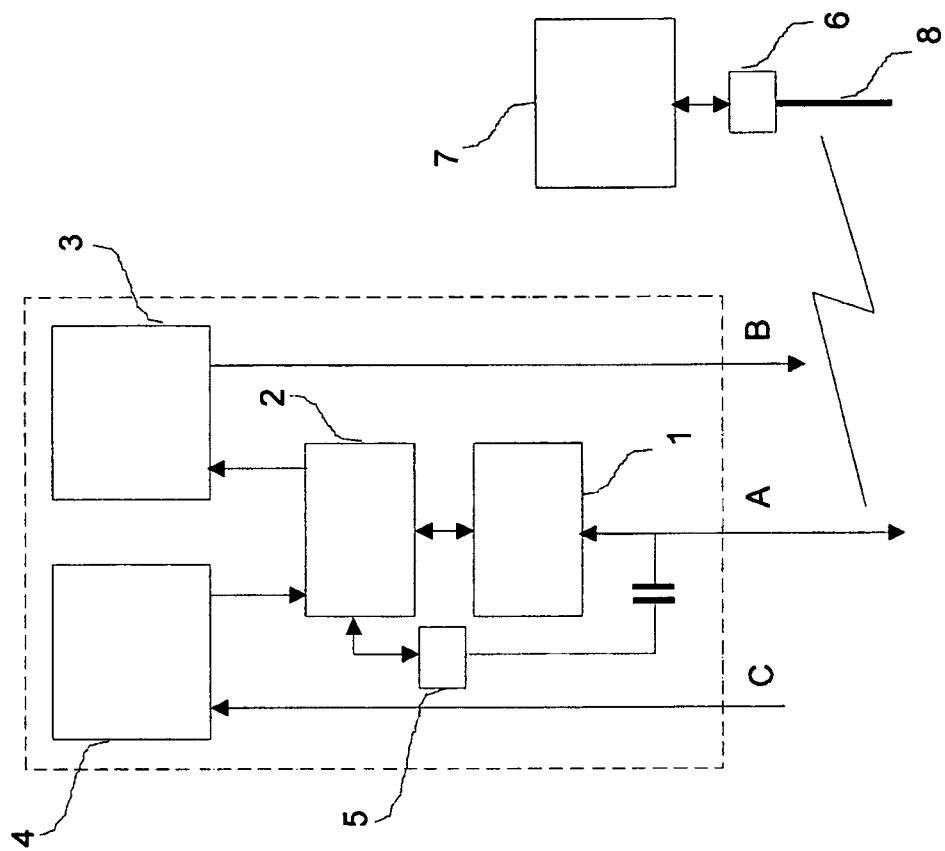
Fig. 2
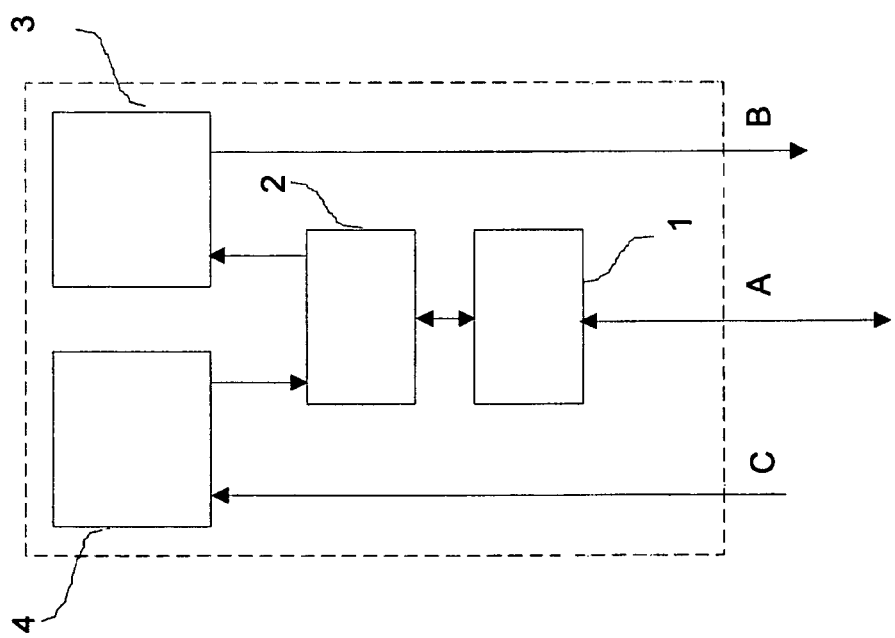
Fig. 1 - Prior Art

SUBSEA ELECTRONICS MODULE AND METHODS OF LOADING SOFTWARE THEREON

CROSS-REFERENCE TO RELATED APPLICATION

This application claims the benefit of United Kingdom Patent Application No. 0714471.0, filed on Jul. 25, 2007, which hereby is incorporated by reference in its entirety.

FIELD OF THE INVENTION

This invention relates to an electronics module for a well installation, and a method of loading software and/or data to such a module.

BACKGROUND OF THE INVENTION

The control of a subsea fluid extraction well is normally effected by a subsea electronic control module (SEM) housed within, or located close to, a subsea control module (SCM) mounted on a well tree, situated on the sea bed at the well head. The SEM is provided with electric power and communications via an umbilical line to a control platform, which may be on a vessel or located on land. Typically, the SEM receives commands via the umbilical communication line to its internal electronics. These are then processed by the SEM, and the resulting electrical outputs are sent to electrically-operated production fluid control valves and/or directional control valves (DCVs) housed in the SCM, which control hydraulic power to hydraulically-operated valves. The SEM also feeds data relating to such operations back to the control platform. Additionally, the SEM electronics handles many other functions, which include the collection and interpretation of data from sensors distributed throughout the production system, such as pressure, temperature, fluid flow, microseismic, oil/water quality and, on more recent systems, compressed video and transmits them back to the control platform. The SEM also houses the electronics required to operate a High Integrity Pipeline Protection System (HIPPS) and the electronics for the communication system, such as modems and routers, or in more modern systems, Ethernet interfaces, as well as communication redundancy.

FIG. 1 shows a block diagram of a typical existing SEM. A modem 1 effects external communication, e.g. to the control platform, through an interface A. The modem 1 communicates internally to an SEM processing means 2, which implements commands from the control platform in the form of outputs to driver circuits 3. These in turn output a multiplicity of drives to external devices such as DCVs through interfaces B. External inputs from a multiplicity of interfaces C connect to signal conditioning electronic circuits 4. These external inputs include for example signals from the SCM such as monitoring functions, e.g. pressure and temperature measurements, positions of valves etc which can have a variety of electrical interfaces. The circuits 4 convert these electrical inputs into a suitable interface for processing means 2. The processing means 2 then processes the inputs and either effects control of the well via the interfaces B and/or outputs data via the modem 1 back to the control platform through the interface A. For the processing means 2 to operate, it is necessary to load data and software to it. This is carried out during factory testing and installation, and is achieved relatively slowly via the modem 1 through the interface A.

Typically, modern SEMs employ processors/microcontrollers to implement the functions described above which has resulted in very large software packages and data having to be loaded in. It takes typically seven hours to load the software/data on a current SEM, via its communication modem, due to the relatively slow speed of the modem. This has a major effect on both testing times and cost. Furthermore, the costs involved in having to take this length of time on the installation vessel at the point of installation are highly significant. One possible solution to this problem could be to add a high-speed data link to the SEM, but this would mean that an additional connector has to be added to the SCM electronic interface plate. However, with the prevailing trend to provide smaller and lighter well control systems containing SCMs, the surface area of the SCM connector end plate has become minimal and there is typically not enough room to add another connector. Furthermore, such a connector may be an expensive device.

SUMMARY OF THE INVENTION

It is an aim of the present invention to overcome these problems, namely to provide a system which enables rapid loading of software or data to a SEM, without requiring an additional connector.

This aim is achieved by incorporating a short range, high frequency, wireless transceiver, such as Bluetooth®, to the internal electronics of a SEM. The existing wires connecting to the internal modem may be utilised as an antenna, and software/data loaded via this link. Thus no additional connector is required at the SCM end plate and if the carrier frequency of the transceiver is in the GHz region and thus wide band, data and software can be loaded rapidly. Since the electronics of the SEM, including the transceiver, is housed in a metal-screened container, spurious radiation from the transceiver is contained. The current cost of small transceivers such as Bluetooth® are insignificant compared with the costs involved with the long software/data loading times of existing systems.

Using the invention, the extensive quantity of software and data required by the processor in a modern SEM can be loaded in a fraction of the time that it takes to load via the normal modem interface, thus making major savings in time and cost in both the manufacturing and test of the product and its installation.

In accordance with a first aspect of the present invention there is provided an electronics module for a well installation as set out in the accompanying claims.

In accordance with a second aspect of the present invention there is provided a method for loading software and/or data to an electronics module for a well installation as set out in the accompanying claims.

BRIEF DESCRIPTION OF THE DRAWINGS

The invention will now be described, by way of example, with reference to the accompanying drawings, in which:—

FIG. 1 schematically shows a known SEM arrangement; and

FIG. 2 schematically shows a SEM and loading means in accordance with the present invention.

DETAILED DESCRIPTION OF THE INVENTION

FIG. 2 schematically shows an SEM in accordance with the invention, together with means for loading software and/or data to the SEM. Components in common with the known SEM shown in FIG. 1 retain the same reference numerals. A transceiver 5 is located within the SEM, and connected to a port on the processing means 2 for communication therewith. The transceiver 5 has an RF input/output coupled, for example capacitively, to the existing modem external interface A. The modem interface A wiring functions as an antenna or aerial for the transceiver 5 in use. Firmware is stored in the processing means 2, typically in ROM, at manufacture. This enables communication between the transceiver 5 and the processing means 2.

In order to load the required software and/or data to processing means 2, an external processor 7 is used, which is connected to a wireless transceiver 6. The processor 7 may for example be a laptop computer, which carries the software/data required by the SEM. Transceiver 6 includes an antenna 8 to effect wireless communication with transceiver 5 via the wiring of modem interface A. In this way, data and/or software can be transmitted at high speed through the wireless interface.

Although the efficiency, as an antenna, of the existing modem wiring is relatively poor, it is adequate to permit successful communication, since the antenna 8 of the external transceiver 6 can be placed very close to the interface A during loading.

In an alternative embodiment of the present invention, not shown, an external processor 7 that has wi-fi capability is employed, together with a wi-fi compatible transceiver 5 in the SEM. With this arrangement, the need for a separate transceiver 6 is eliminated.

The above-described embodiments are exemplary only, and various alternatives are possible within the scope of the claims.

Although Bluetooth® and wi-fi have been specifically mentioned, any other wireless communication systems and protocols may be used provided that they are capable of handling the necessary volume of data at the required rate for satisfactory operation of the electronics module.

It is envisaged that the present invention may either be used to effect loading of the software and/or data in the first instance, or may be used as a back-up arrangement to current methods if necessary.

The invention claimed is:

1. A subsea electronics module (SEM) containing electronics for controlling a subsea control module of a subsea well installation, the subsea electronics module comprising:
    a short-range wireless receiver for wirelessly receiving software from an external source, the short range wireless receiver operably coupled to one or more subsea electronics module communication components, the subsea electronics module configured to be housed within a subsea control module located at a subsea wellhead of a subsea well installation or mounted on a well tree close to the subsea control module, and containing electronics for controlling the subsea control module;
    wherein the one or more subsea electronic module communication components comprise a wired modem and associated modem external interface wiring configured to receive data via a direct wired connection; and
    wherein the associated modem external interface wiring is connected to the short-range wireless receiver for functioning as an antenna of the short-range wireless receiver to receive the software via a wireless transmission between the associated modem external interface wiring and an external antenna of an external software source.

2. A subsea electronics module according to claim 1, further comprising a container defining a housing, wherein the short range wireless receiver and the modem are both contained within the housing, and wherein the subsea control module is configured to be mounted on the well tree at the wellhead.

3. A subsea electronics module according to claim 2, wherein at least a portion of the associated modem external interface wiring functioning as an antenna of the short-range wireless receiver is contained within the housing, and wherein the short-range wireless receiver is operably coupled to the at least a portion of the associated modem external interface wiring contained within the housing.

4. A subsea electronics module according to claim 1, further comprising processing means, and wherein the short-range wireless receiver is also connected to the processing means for communication therewith, bypassing the modem.

5. A subsea electronics module according to claim 1, wherein the short-range wireless receiver functions as a transceiver.

6. A subsea electronics module according to claim 1, wherein the short-range wireless receiver is configured for short-wavelength radio communications in the 2400-2480 MHz range.

7. A subsea electronics module according to claim 1, wherein the short-range wireless receiver has a carrier frequency in the order of GHz.

8. A subsea electronics module according to claim 1, wherein the short-range wireless receiver is configured for wirelessly exchanging data over a computer local area network.

9. A subsea electronics module according to claim 1, adapted for underwater installation, comprising:
    processing means,
    wherein the modem and associated modem external interface wiring are configured to receive data via a direct wired connection; and
    wherein the short-range wireless receiver is connected to both the processing means and the associated modem external interface wiring for communication therebetween to thereby bypass the modem.

10. A method of loading software on a subsea electronics module (SEM) for a subsea well installation, comprising the steps of:
    a) providing a subsea electronics module comprising a short-range wireless receiver, the subsea electronics module configured to be housed within a subsea control module located at a subsea wellhead of a subsea well installation or mounted on a well tree close to the subsea control module;
    b) providing a processor, external to the subsea electronics module, connected to wireless transmission means; and
    c) initially loading software from the processor to the subsea electronics module via a wireless transmission between the wireless transmission means and short-range wireless receiver prior to deployment of the subsea electronics module to a subsea location of a subsea well installation;
    wherein the subsea electronics module comprises a wired modem and associated modem external interface wiring configured to receive data via a direct wired connection, the associated modem external interface wiring functions as an antenna for the short-range wireless receiver, and wherein the software is received by the short range wireless receiver via the antenna.

11. A method according to claim 10, wherein the subsea electronics module further comprises a container defining a housing, wherein the short range wireless receiver and the modem are both contained within the housing, and wherein the subsea control module is configured to be mounted on the well tree at the wellhead.

12. A method according to claim 11, wherein the at least a portion of associated modem external interface wiring is contained within the housing, and wherein the short-range wireless receiver is operably coupled to the at least a portion of the associated modem external interface wiring contained within the housing.

13. A method according to claim 12, wherein the subsea electronics module further comprises a processor, and wherein the short-range wireless receiver is also connected to the processor for communication therewith, bypassing the modem, and wherein the loading step is carried out during initial installation of the software in the subsea electronics module.

14. A method of installing software on a subsea electronics module (SEM) for a subsea well installation, the method comprising the steps of:
   providing a subsea electronics module for a subsea well installation, the subsea electronics module configured to be housed within a subsea control module located at a subsea wellhead of a subsea well installation or mounted on a well tree close to the subsea control module, the subsea electronics module comprising a housing, a processor and a wired modem in communication with the processor contained within the housing, a modem external interface comprising modem external interface wiring at least partially contained within the housing, a short-range wireless receiver contained within the housing and operably coupled to the subsea electronics module processor and to portions of the modem external interface wiring contained within the housing to bypass the modem when receiving certain software for use by the processor;
   providing an external processor operably coupled to a wireless transmitter comprising an external antenna, located external to the subsea electronic module and the modem external interface wiring and having software associated therewith for loading on the subsea electronic module defined as initial installation software for the subsea electronic module; and
loading the subsea electronic module with the initial installation software utilizing the modem external interface wiring as an antenna for the short-range wireless receiver, the initial installation software loaded from the external processor via wireless transmission between the external antenna and the modem external interface wiring prior to deployment of the subsea electronics module to a subsea location of a subsea well installation.

15. A method as defined in claim 14, wherein the subsea control module is configured to be mounted on the well tree at the wellhead, and wherein the step of loading the subsea electronic module with the initial installation software comprises the step of:
   positioning the external antenna adjacent the modem external interface wiring.

16. A method as defined in claim 14, wherein the step of loading the initial installation software is performed utilizing the short-range wireless receiver, a load rate of the short-range wireless receiver receiving the initial installation software via the modem external interface wiring being substantially higher than that capable if the same initial installation software were instead loaded directly through the modem and modem external interface wiring at its maximum capability via wireline connection to the modem external interface wiring also initially and prior to deployment of the subsea electronics module to the subsea location of the subsea well installation.

17. A method as defined in claim 14, wherein the step of loading the subsea electronic module software is performed during factory testing and installation, the wireless transmission received by the short-range wireless receiver, bypassing the modem.

18. A subsea electronics module (SEM) configured to be housed within a subsea control module located at a subsea wellhead of a subsea well installation or mounted on a well tree close to the subsea control module and containing electronics for controlling the subsea control module of a well installation, the subsea electronics module comprising:
   a container defining a housing;
   a wired modem contained within the housing;
   associated modem external interface wiring configured to receive data via a direct wired connection at least partially contained within the housing;
   a processor contained within the housing;
   a short-range wireless receiver for receiving software from an external source and contained within the housing, the short-range wireless receiver operably coupled to the processor and portions of the modem external interface wiring contained within the housing to thereby bypass the modem when receiving the software, wherein
the modem external interface wiring associated with said communication component functions as an antenna for the short-range wireless receiver.

19. A method of loading software on a subsea electronics module (SEM) for a well installation, the method comprising the steps of:
   a) providing a subsea electronics module configured to be housed within a subsea control module located at a subsea wellhead of a subsea well installation or mounted on a well tree close to the subsea control module, the subsea electronics module comprising a housing, a wired modem, and a short-range wireless receiver coupled to modem external interface wiring, the wired modem, the short-range wireless receiver, and portions of the modem external interface wiring contained within the housing, the short-range wireless receiver positioned to bypass the modem;
   b) providing an external processor, external to the housing of the subsea electronics module, connected to wireless transmission means; and
   c) loading initial installation software from the external processor to the subsea electronics module via a wireless transmission between the wireless transmission means and the short-range wireless receiver prior to operational deployment of the subsea electronics module to a subsea location of a subsea well installation, said associated modem external interface wiring functioning as an antenna for the short-range wireless receiver.

* * * * *